United States Patent
Bang et al.

(10) Patent No.: US 12,548,114 B2
(45) Date of Patent: Feb. 10, 2026

(54) METHOD FOR CODE-LEVEL SUPER RESOLUTION AND METHOD FOR TRAINING SUPER RESOLUTION MODEL THEREFOR

(71) Applicant: SK Telecom Co., Ltd., Seoul (KR)

(72) Inventors: Du Hyeon Bang, Seoul (KR); Seong Won Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 483 days.

(21) Appl. No.: 17/972,034

(22) Filed: Oct. 24, 2022

(65) Prior Publication Data

US 2023/0130288 A1 Apr. 27, 2023

(30) Foreign Application Priority Data

Oct. 25, 2021 (KR) .................. 10-2021-0142585

(51) Int. Cl.

| | |
|---|---|
| *G06T 3/4053* | (2024.01) |
| *G06N 20/00* | (2019.01) |
| *G06T 3/4046* | (2024.01) |
| *G06T 3/4092* | (2024.01) |
| *G06T 7/00* | (2017.01) |
| *G06T 9/00* | (2006.01) |

(52) U.S. Cl.
CPC .......... *G06T 3/4053* (2013.01); *G06T 7/0002* (2013.01); *G06T 9/00* (2013.01); *G06T 2207/20081* (2013.01); *G06T 2207/30168* (2013.01)

(58) Field of Classification Search
CPC ....... G06T 3/4053; G06T 7/0002; G06T 9/00; G06T 2207/20081; G06T 2207/30168; G06T 3/4046; G06T 3/4092; G06N 20/00
See application file for complete search history.

(56) References Cited

U.S. PATENT DOCUMENTS

| | | | |
|---|---|---|---|
| 6,256,413 B1 * | 7/2001 | Hirabayashi | H04N 19/61 |
| | | | 375/E7.218 |
| 11,849,128 B2 * | 12/2023 | Rippel | G06V 20/46 |
| 2020/0034709 A1 * | 1/2020 | Rippel | G06F 18/214 |
| 2020/0082573 A1 * | 3/2020 | Zhang | G06T 9/00 |
| 2021/0084313 A1 * | 3/2021 | Nguyen | G06T 5/70 |

(Continued)

FOREIGN PATENT DOCUMENTS

KR 10-1717377 B1 3/2017

OTHER PUBLICATIONS

T. Guo, H. Seyed Mousavi and V. Monga, "Adaptive Transform Domain Image Super-Resolution via Orthogonally Regularized Deep Networks," in IEEE Transactions on Image Processing, vol. 28, No. 9, pp. 4685-4700, Sep. 2019, doi: 10.1109/TIP.2019.2913500. (Year: 2019).*

(Continued)

*Primary Examiner* — Gregory A Morse
*Assistant Examiner* — Ronde Lee Miller
(74) *Attorney, Agent, or Firm* — WTA IP Law P.C.

(57) ABSTRACT

The present disclosure provides a method for code-level super-resolution imaging and a method of training a super-resolution model therefor. According to some embodiments, the present disclosure provides a method of training a super-resolution model based on the encoded codes of an inputted picture and a method for code-level super-resolution imaging by using a pre-trained super-resolution model.

8 Claims, 4 Drawing Sheets

(56) References Cited

U.S. PATENT DOCUMENTS

| | | | |
|---|---|---|---|
| 2021/0150660 A1* | 5/2021 | An | G06N 20/00 |
| 2021/0287338 A1* | 9/2021 | Shih | G06T 7/0002 |
| 2022/0270207 A1* | 8/2022 | Chen | G06T 3/4053 |
| 2023/0130288 A1* | 4/2023 | Bang | G06T 3/4053 |
| | | | 382/155 |
| 2023/0154132 A1* | 5/2023 | Oh | G06T 5/50 |
| | | | 382/294 |
| 2023/0267583 A1* | 8/2023 | Pranskevichus | G06T 5/73 |
| | | | 382/157 |

OTHER PUBLICATIONS

Wenming Yang et al., "Deep Learning for Single Image Super-Resolution: A Brief Review", arXiv:1808.03344v3 [cs.CV], Jul. 12, 2019, pp. 1-16.

* cited by examiner

METHOD FOR CODE-LEVEL SUPER RESOLUTION AND METHOD FOR TRAINING SUPER RESOLUTION MODEL THEREFOR

CROSS-REFERENCE TO RELATED APPLICATION

This application is based on, and claims priority to, Korean Patent Application Number 10-2021-0142585, filed on Oct. 25, 2021, the disclosure of which is incorporated by reference herein in its entirety.

TECHNICAL FIELD

The present disclosure in some embodiments relates to a method for code-level super-resolution image enhancement and a method for training a super-resolution model therefor.

BACKGROUND

The statements in this section merely provide background information related to the present disclosure and do not necessarily constitute prior art.

Super-resolution imaging is a technique for estimating a high-resolution picture from a low-resolution picture, and such estimation is mainly performed at the picture level. For example, user equipment or a terminal requested to service a high-resolution picture receives and converts low-resolution encoded codes into a low-resolution picture, and inputs the low-resolution picture into a super-resolution model to obtain the high-resolution picture.

Consequently, development is actively conducted for a super-resolution model or a super-resolution technique. For example, a model has been devised for receiving a low-resolution picture to generate an intermediate high-resolution picture and inputting both the low-resolution picture and the intermediate high-resolution picture to generate a final high-resolution picture. As another example, a technique has been devised for calculating in advance a super-resolution parameter for super-resolution processing of a picture expected to be viewed by a user and reflecting the super-resolution parameter in a super-resolution model according to a user's service request.

However, these super-resolution models or super-resolution techniques are performed at the picture level, which makes the super-resolution imaging to be ineptly dependent upon the computing resource of the user equipment.

SUMMARY

According to at least one embodiment, the present disclosure provides a method of training a super-resolution model to perform super-resolution imaging at a code level, including calculating input encoded codes by encoding a lowered-resolution picture that is made from an inputted picture, inputting the input encoded codes into the super-resolution model, and predicting, as prediction encoded codes, encoded codes of a high-resolution picture corresponding to the input encoded codes, and training the super-resolution model based on a correct-answer set including at least one of the inputted picture and encoded codes obtained by encoding the inputted picture, and an inference set including at least one of the prediction encoded codes and a prediction picture generated based on the prediction encoded codes.

According to another embodiment, the present disclosure provides a computer program stored in a computer-readable medium for executing the aforementioned steps respectively included in the method of training a super-resolution model.

According to yet another embodiment, the present disclosure provides a method for super-resolution imaging by using a pre-trained super-resolution model to perform super-resolution imaging at a code level, including obtaining, as subject encoded codes, encoded codes of a subject picture, outputting prediction encoded codes by inputting the subject encoded codes into the pre-trained super-resolution model, and decoding the prediction encoded codes to calculate a prediction picture corresponding to the subject picture.

DETAILED DESCRIPTION

Figure 1:
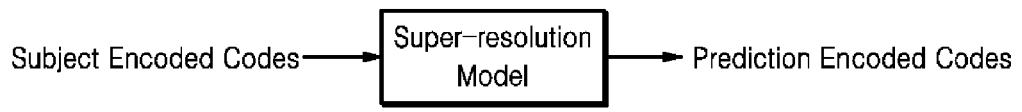
FIG. 1 is a conceptual diagram of a super-resolution model according to at least one embodiment of the present disclosure.

Aspects of the present disclosure can provide a super-resolution model for performing super-resolution imaging at the code level.

Another aspect of the present disclosure can perform super-resolution imaging at the code level by using a pre-trained super-resolution model.

Unrestricted to those aspects set forth herein, the present disclosure has other aspects that will become more apparent to one of ordinary skill in the art to which the present disclosure pertains from the detailed description of the present disclosure as follows.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of the present disclosure to be presented below in conjunction with the accompanying drawings is intended to describe exemplary embodiments of the present disclosure and is not intended to represent the only embodiments in which the technical idea of the present disclosure may be practiced.

In the present disclosure, disclosed are a training method of a super-resolution model for performing super-resolution imaging at the code level and a super-resolution imaging method using the same. In the present disclosure, the super-resolution model is adapted to receive encoded codes of an original picture to be super-resolution processed and to predict and output superior encoded codes of a desired high-resolution picture with an enhanced resolution over the original picture. Accordingly, super-resolution imaging in the present disclosure may be performed at any stage capable of obtaining coded codes of a picture.

The super-resolution model training method of the present disclosure is performed by a training apparatus that is executed on a computing device. The training apparatus causes its functions to each be executed by one or more processors available to the computing device and includes computer-readable storage connected with the processors and having computer-executable instructions stored therein.

The super-resolution imaging method of the present disclosure is performed by a super-resolution imaging apparatus which is executed on a computing device. The super-resolution imaging apparatus causes its functions to be each executed by one or more processors available to the computing device and includes computer-readable storage connected with the processors and having computer-executable instructions stored therein.

Meanwhile, the super-resolution imaging apparatus may be a system including a server, a repeater, user equipment, etc., but is not limited thereto. The training apparatus and the super-resolution imaging apparatus may be in unity or separated.

FIG. 1 is a conceptual diagram of a super-resolution model according to at least one embodiment of the present disclosure.

The super-resolution model according to at least one embodiment of the present disclosure receives the encoded codes (hereinafter, subject encoded codes) of the picture that is subject to super-resolution processing (hereinafter, subject picture), and predicts and outputs superior encoded codes (hereinafter, prediction encoded codes) of a desired high-resolution picture with an enhanced resolution over the subject picture. The super-resolution model is a neural network model, and may be a machine learning-or deep learning-based model pre-trained to receive subject encoded codes and output prediction encoded codes. The neural network structure of the super-resolution model may be one obtained by employing or modifying all or some of a conventional picture-level neural network model structure.

When a terminal requests a subject picture or when a service server intends to transmit a subject picture, the system generally transmits and receives encoded codes having a relatively small data size in consideration of a communication environment with the terminal. Such encoded codes may be those obtained by encoding a subject picture or those obtained by encoding a subject picture with its resolution changed. Accordingly, the subject encoded codes may be those received by the super-resolution imaging apparatus.

Alternatively, the subject encoded codes may be obtained by encoding the subject picture by the super-resolution imaging apparatus.

Figure 2:
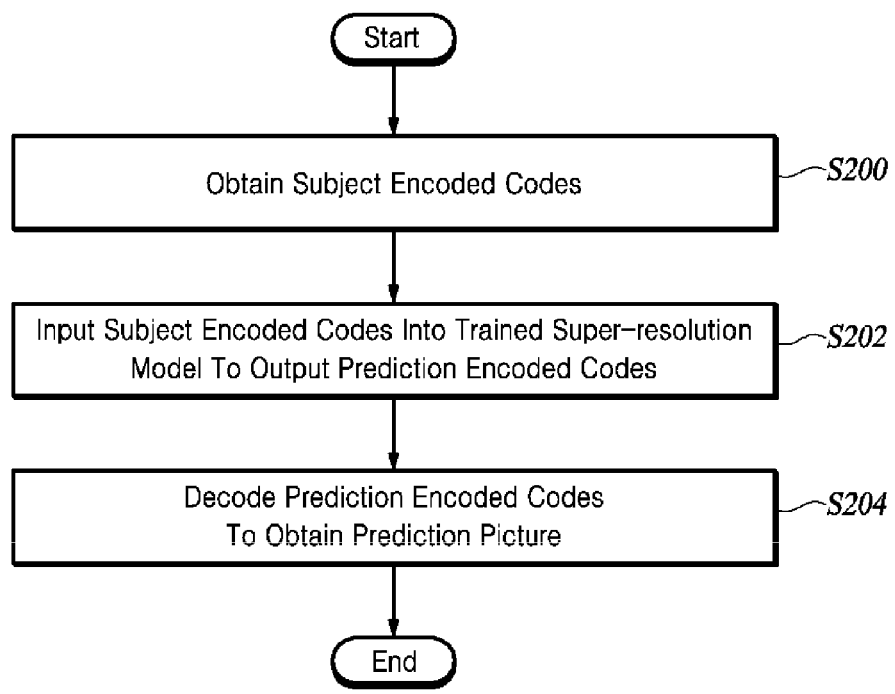
FIG. 2 is a flowchart of a super-resolution imaging method according to at least one embodiment of the present disclosure.

FIG. 2 is a flowchart of a super-resolution imaging method according to at least one embodiment of the present disclosure.

The super-resolution imaging apparatus obtains subject encoded codes (S200). The super-resolution imaging apparatus may obtain the subject encoded codes by receiving them from a server or the like, or generate its subject encoded codes from the subject picture.

The super-resolution imaging apparatus receives prediction encoded codes outputted after inputting the subject encoded codes to the pre-trained super-resolution model (S202).

The super-resolution imaging apparatus decodes the prediction encoded codes to obtain a prediction picture (S204). Here, the prediction picture is the target picture that is predictably enhanced in resolution. The super-resolution imaging apparatus may perform just Steps S200 to S202 by using the super-resolution model, skipping Step S204.

Figure 3:
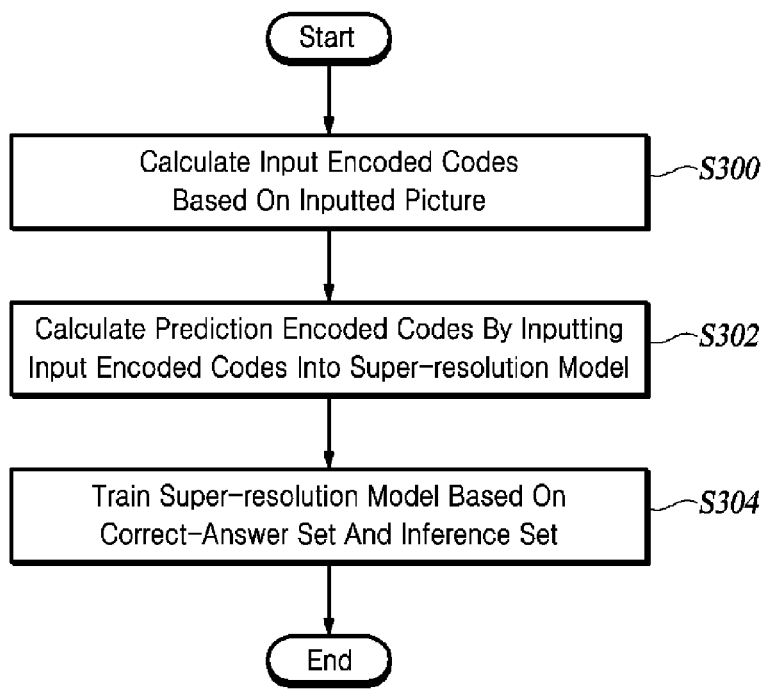
FIG. 3 is a flowchart of a super-resolution model training method according to at least one embodiment of the present disclosure.

FIG. 3 is a flowchart of a super-resolution model training method according to at least one embodiment of the present disclosure.

FIG. 3 discloses a method of training the super-resolution model by pre-processing an inputted picture to train the super-resolution model. It is presumed that the inputted picture is a high-resolution picture that serves as a set of correct answers.

The training apparatus encodes a lowered-resolution picture that is made from an inputted picture to calculate input encoded codes (S300). The original inputted picture may be any picture included in the training dataset. The lowered-resolution picture from the inputted picture may be a picture that the training apparatus receives along with the original inputted picture, or it may be obtained by the training apparatus lowering the resolution of the original inputted picture by using a down-sampling technique or the like.

The training apparatus inputs the input encoded codes into a super-resolution model to calculate prediction encoded codes (S302). The super-resolution model predicts the encoded codes of the picture corresponding to the input encoded codes, that is, the lowered-resolution picture from the inputted picture and outputs the same encoded codes as prediction encoded codes.

The training apparatus trains the super-resolution model based on a correct-answer set including at least one of the inputted picture and codes obtained by encoding the inputted picture, and an inference set including at least one of the prediction encoded codes and a prediction picture generated based on the prediction encoded codes (S304). The training apparatus may evaluate the performance of the super-resolution model based on the correct-answer set and the inference set, and reflect the evaluation results in the super-resolution model.

For example, the training apparatus may compare the resolution between the prediction picture obtained by decoding the prediction encoded codes and the inputted picture, evaluate the performance of the super-resolution model, and update the super-resolution model. Additionally, the training apparatus may evaluate the performance of the super-resolution model by calculating a distance between the encoded codes of the inputted picture and the prediction encoded codes.

Here, the reflection of the evaluation result may be to update the neural network parameters or weights of the super-resolution model to enhance the resolution, but is not limited thereto. This update may be performed based on a performance evaluation result for a training data set including a plurality of pictures.

Figure 4:
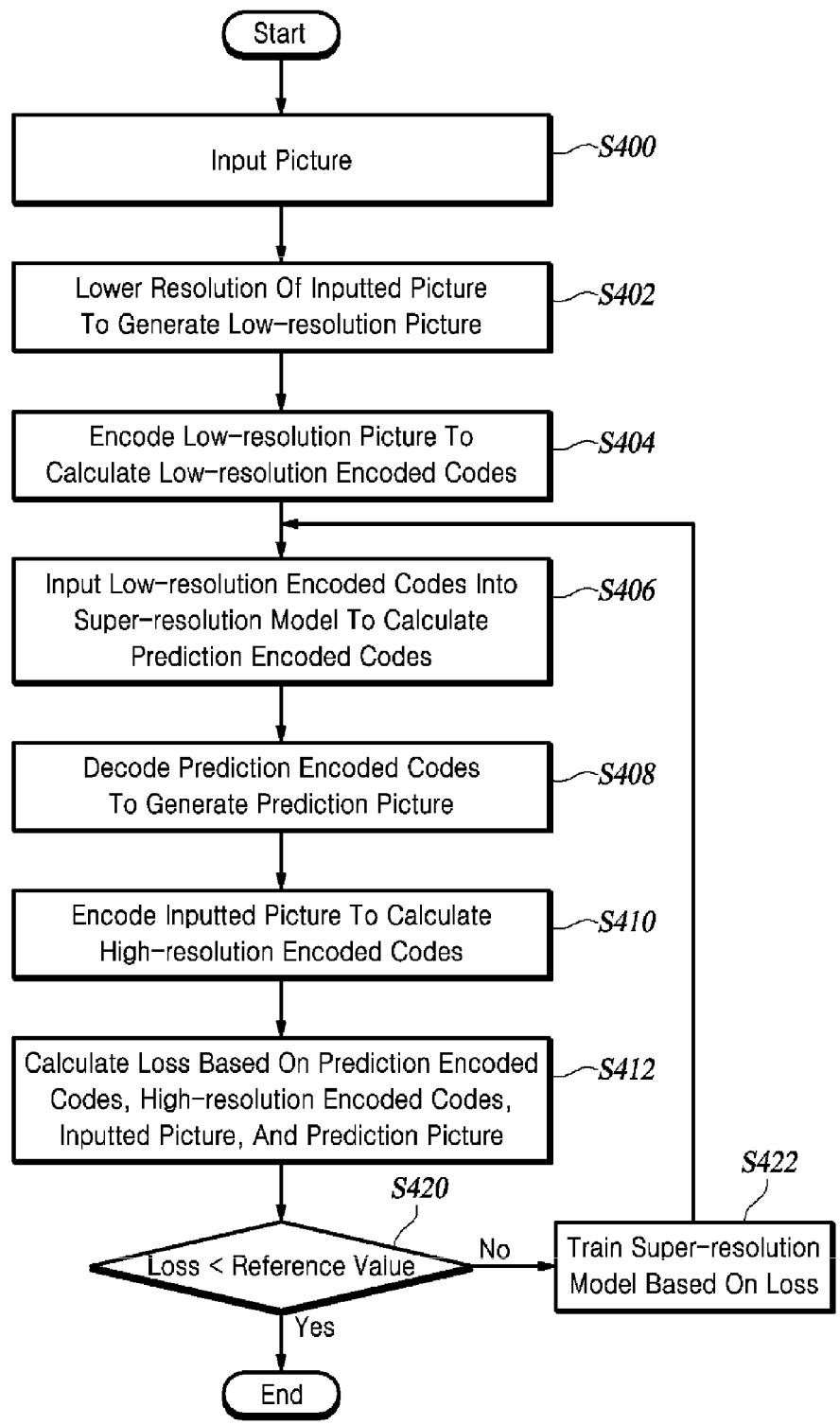
FIG. 4 is a particularized flowchart of the super-resolution model training method according to at least one embodiment of the present disclosure.

FIG. 4 is a particularized flowchart of the super-resolution model training method according to at least one embodiment of the present disclosure.

FIG. 4 is an embodiment that particularly materializes the super-resolution model training method of FIG. 3, assuming that the inputted picture is a high-resolution picture.

The training apparatus receives a picture that is inputted (S400). The inputted picture may be any picture included in the training dataset.

The training apparatus generates a low-resolution picture corresponding to the inputted picture by reducing the resolution of the inputted picture (S402). Meanwhile, some other embodiments may skip Step S402 and receive the lowered-resolution picture in Step S400 or before and after Step S400.

The training apparatus encodes the low-resolution picture to calculate low-resolution encoded codes (S404).

The training apparatus inputs the low-resolution encoded codes into the super-resolution model to calculate prediction encoded codes (S406).

The training apparatus decodes the prediction encoded codes to generate a prediction picture (S408).

The training apparatus encodes the inputted picture to calculate high-resolution encoded codes (S410). Meanwhile, some other embodiments may skip Step S410, wherein the high-resolution encoded codes may be inputted before Step S412.

To evaluate the performance of the super-resolution model, the training apparatus calculates a loss based on codes obtained by encoding the inputted picture and based on prediction encoded codes or calculates a loss based on the predicted picture and the inputted picture (S412). Alternatively, the training apparatus may calculate the loss by using a preset loss function using, as parameters, the prediction encoded codes, the high-resolution encoded codes, the prediction picture, and the inputted picture.

Equation 1 is an example preset loss function.

$$\mathrm{argmin}_\theta \alpha \times \mathcal{L}(X_H - \mathrm{Dec}(S_\theta(\mathrm{Enc}(X_L)))) + (1-\alpha) \times \mathcal{L}(\mathrm{Enc}(X_H) - S_\theta(\mathrm{Enc}(X_L)))$$ Equation 1

Here, $\theta$ is a learning parameter, $\alpha$ is a hyperparameter that a value between [0, 1] and determines the importance between the L function on the left and the L function on the right, $\mathrm{argmin}_\theta \alpha$ is a function that minimizes $\alpha$, and L is a function representing a difference, $X_H$ is a high-resolution input, $X_L$ is a low-resolution input, L is a super-resolution model of the present disclosure based on the learning parameter $\theta$, Enc is encoding, and Dec is decoding.

When calculating in FIG. 4 the loss by applying Equation 1, $X_H$ is the inputted picture, and $X_L$ is the low-resolution picture generated in Step S402. Accordingly, the term Dec($S_\theta(\mathrm{Enc}(X_L))$) in Equation 1 becomes a prediction picture, and $S_\theta(\mathrm{Enc}(X_L))$ in Equation 1 becomes the prediction encoded codes. Enc($X_H$) in Equation 1 becomes the high-resolution encoded codes.

The loss of Step S412 may be perceptual. The perceptual loss is a value obtained by comparing a feature map extracted from a specific layer after inputting an input that is the low-resolution picture and ground truth (GT) to a pre-trained deep learning-based classification model. Since the perceptual loss is calculated based on perceptual similarity rather than pixel-based similarity, Step S422 may allow the super-resolution model to be trained to calculate the encoded codes of the perceptively enhanced picture. In the illustration of FIG. 4, GT inputted to the classification model is the inputted picture, and the input is the low-resolution picture generated in Step S402.

The training apparatus determines whether the loss is smaller than a preset reference value (S420).

When Step S420 determines that the loss is not smaller than the reference value, the training apparatus trains the super-resolution model based on the loss (S422). Thereafter, the process returns to Step S406 to perform prediction.

When Step S420 determines that the loss is smaller than the reference value, the training apparatus terminates the training procedure for the picture inputted in Step S400 without further training the super-resolution model. In this case, the training apparatus may perform Steps S400 to S422 on the next picture in the training dataset.

Although the respective steps in FIGS. 2-4 are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by FIGS. 2-4 or by performing one or more of the steps in FIGS. 2-4 in parallel, without departing from the gist and nature of at least one embodiment of the present disclosure, and hence the steps in FIGS. 2-4 are not limited to the illustrated chronological sequences.

Figure 5:
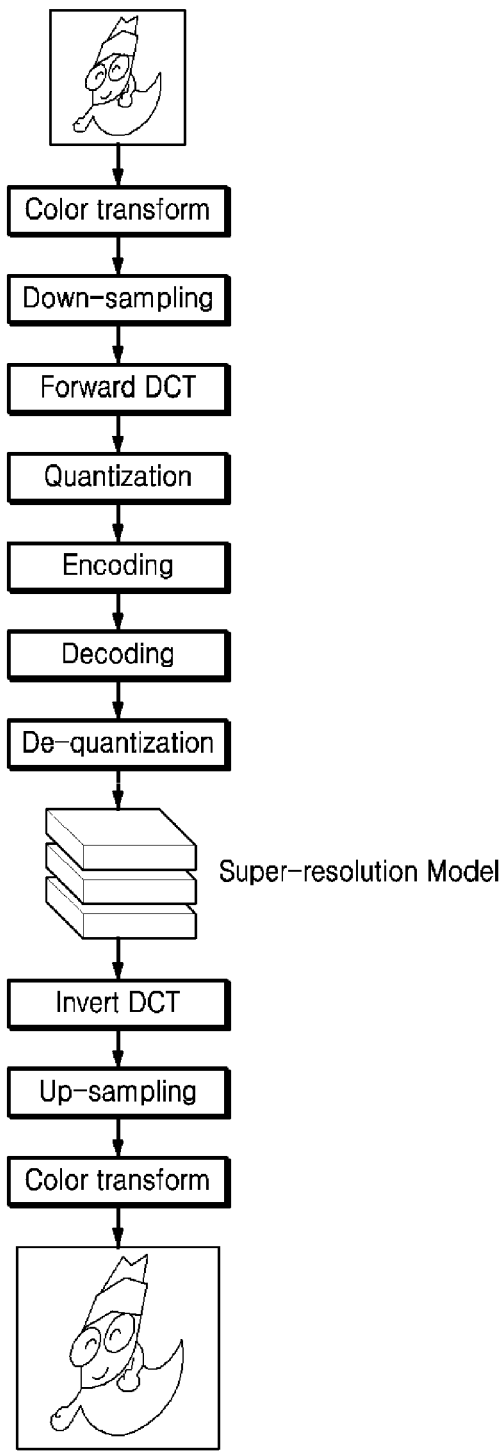
FIG. 5 is a diagram illustrating an example case of applying the super-resolution imaging method to a standard Joint Photographic Exports Group (JPEG) picture, according to at least one embodiment of the present disclosure.

FIG. 5 is a diagram illustrating an example case of applying the super-resolution imaging method to a standard JPEG picture, according to at least one embodiment of the present disclosure.

FIG. 5 shows an example of performing super-resolution imaging on a picture encoded and/or decoded based on a JPEG compression standard (JPEG or JPEG 2000).

Encoding according to the JPEG compression standard sequentially performs color transform, down-sampling, discrete cosine transform (DCT), quantization, and entropy coding.

The color transform is to convert the color information of a picture into an RGB scheme.

The downsampling is converting the color information of a picture represented by RGB to a YCbCr scheme. In this case, the Y component having brightness information is maintained, and the Cb and Cr components having color information are compressed.

The DCT is to transform the color space of a picture into a frequency domain, and the resulting picture is a converted DCT coefficient map in which relatively low-frequency components are arranged toward the upper left and relatively high-frequency components are arranged toward the lower right.

Thereafter, quantization is performed on the DCT coefficient map. The quantization may be performed by dividing each DCT coefficient by each constant of the quantization matrix and rounding. The compression rate of JPEG compression may be adjusted by adjusting the value of the quantization matrix. In general, the greater the value of the quantization matrix, the higher the compression ratio, and the smaller the value of the quantization matrix, the lower the compression ratio but with increasing quality of the compressed image.

Thereafter, entropy coding is performed on the quantized DCT coefficients. Specifically, the quantized DCT coefficients are encoded by using a Different PCM (DPCM) algorithm or undergo run-length encoding, and Huffman coding is performed on the encoded result.

The picture encoded by the standard JPEG compression technique is decoded through the steps of entropy decoding, de-quantization, inverse DCT, upsampling, and color transformation in sequence. Accordingly, the super-resolution process according to the present disclosure may be performed at any stage of the entire decoding stage. For example, the super-resolution process according to the present disclosure may be performed before/after entropy decoding, before inverse quantization, and before inverse DCT.

For example, the super-resolution imaging may be performed by using the DCT coefficient map obtained by inverse quantization as an input of the super-resolution model as in FIG. 5. In this case, the subject encoded codes refer to the result of color transform, downsampling, and DCT performed on the subject picture.

In some other embodiments, super-resolution imaging may be performed after entropy decoding. In this case, the subject encoded codes result from color transformation, downsampling, DCT, and quantization performed on the subject picture.

Various implementations of the apparatuses, units, processes, and the like described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. The computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as a ROM, CD-ROM, magnetic tape, floppy disk, memory card, hard disk, optical/magnetic disk, storage devices, and the like. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, or a mobile device.

According to at least one aspect, the present disclosure can train a super-resolution model to predict, from original encoded codes, encoded codes of a desired high-resolution picture with an enhanced resolution over a picture corresponding to the original encoded codes.

According to another aspect, the present disclosure can perform super-resolution imaging by using a super-resolution model pre-trained to perform super-resolution imaging at the code level.

As a result, the super-resolution model according to the present disclosure can reduce the data size of input/output data compared to the conventional picture-level super-resolution model, thereby minimizing the influence of the communication environment or computing performance of the repeater or user equipment when performing super-resolution imaging, resulting in saved resources required for super-resolution processing.

It should be noted that the effects of the present disclosure are not limited to those mentioned above, and other effects not mentioned will be apparent to those skilled in the art from the above description.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method of training to perform super-resolution imaging at a code level, the method comprising:
receiving an input picture;
generating a lowered-resolution picture from the received input picture;
generating input encoded codes by encoding the lowered-resolution picture;
providing the input encoded codes into a super-resolution model to generate, as prediction encoded codes, encoded codes of a high-resolution picture corresponding to the input encoded codes; and
training the super-resolution model based on a loss function defined as a combination of a first difference and a second difference, the first difference representing a difference between the input picture and a decoded version of the prediction encoded codes, and the second difference representing a difference between encoded codes of the input picture and the prediction encoded codes.

2. The method of claim 1, wherein the generation of the input encoded codes comprises down-sampling the input picture.

3. The method of claim 1, wherein the training of the super-resolution model comprises:
determining a perceptual loss by comparing a feature map extracted from a layer of the super-resolution model and a correct-answer set.

4. A non-transitory computer-readable medium storing instructions thereon, the instructions when executed by one or more processors cause the one or more processor to:
receive an input picture;
generate a lowered-resolution picture from the received input picture;
generate input encoded codes by encoding the lowered-resolution picture;
provide the input encoded codes into a super-resolution model to generate, as prediction encoded codes, encoded codes of a high-resolution picture corresponding to the input encoded codes; and
train the super-resolution model based on a loss function defined as a combination of a first difference and a second difference, the first difference representing a difference between the input picture and a decoded version of the prediction encoded codes, and the second difference representing a difference between encoded codes of the input picture and the prediction encoded codes.

5. A method for super-resolution imaging by using a pre-trained super-resolution model to perform super-resolution imaging at a code level, the method comprising:
obtaining, as subject encoded codes, encoded codes of a subject picture;
providing the subject encoded codes into the pre-trained super-resolution model to generate prediction encoded codes, wherein the pre-trained super-resolution model is obtained by iteratively training based on a loss function defined as a combination of a first difference and a second difference, the first difference representing a difference between an input picture and a decoded version of encoded codes predicted by an untrained super-resolution model, and the second difference representing a difference between encoded codes of the input picture and the encoded codes predicted by the untrained super-resolution model;
decoding the prediction encoded codes to generate decoded prediction codes; and
generating a version of the subject picture with increased resolution based on the decoded prediction codes.

6. The method of claim 5, wherein the super-resolution model is trained further by:
receiving the input picture;
generating a lowered-resolution picture from the received input picture;
generating input encoded codes by encoding the lowered-resolution picture; and
providing the input encoded codes into the untrained super-resolution model to generate, as prediction encoded codes, encoded codes of a high-resolution picture corresponding to the input encoded codes.

7. The method of claim 5, wherein the subject encoded codes are generated by entropy decoding and de-quantizing a compressed picture.

8. The method of claim 7, wherein inverted discrete cosine transform (DCT) is performed on the prediction encoded codes to generate the version of the subject picture with increased resolution.

* * * * *